Sept. 30, 1924.
G. P. DORRIS
STEERING WHEEL BRAKE FOR AUTOMOBILES
Filed March 12, 1923
1,510,264
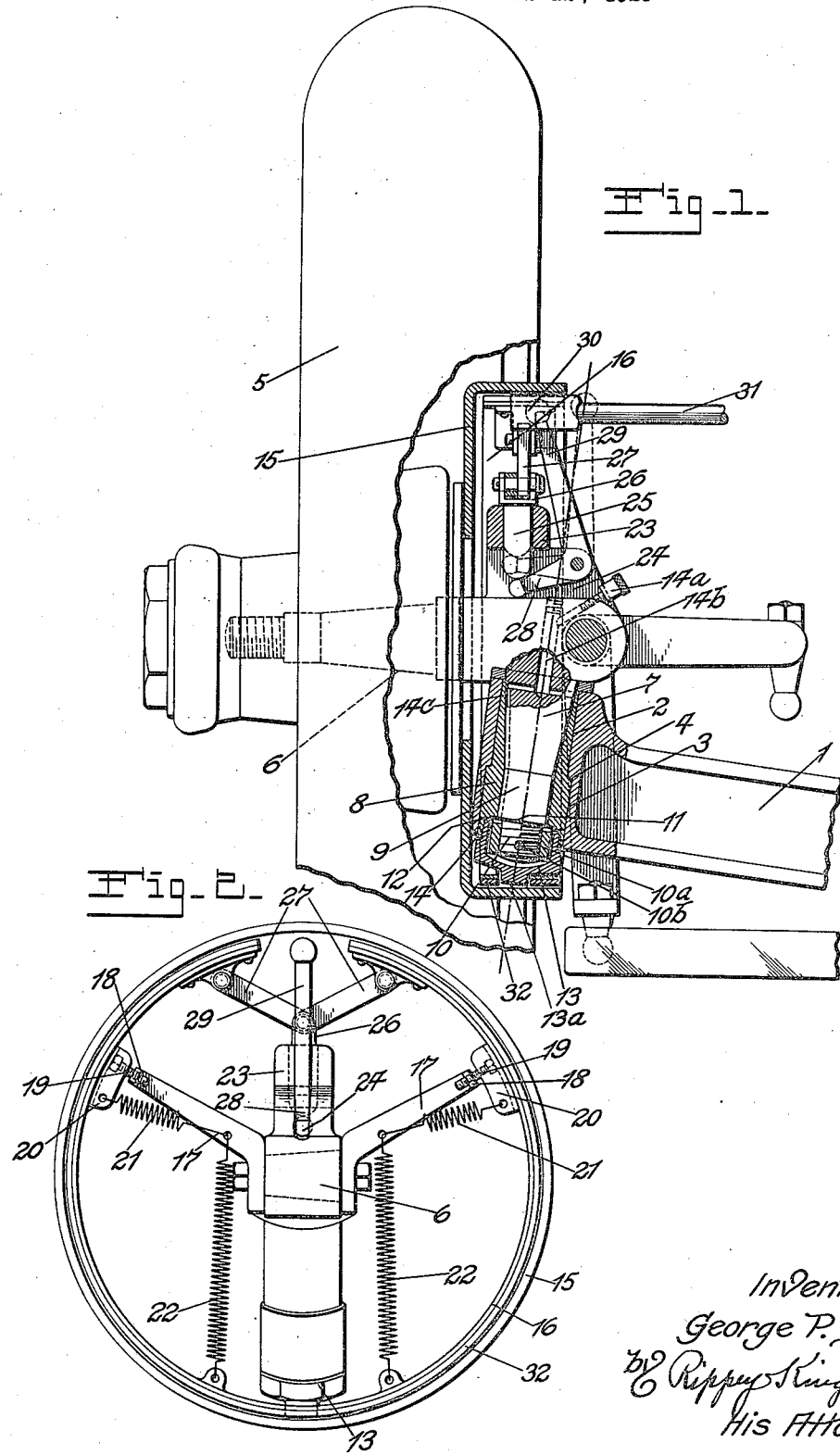
Inventor:
George P. Dorris,
by Rippey Kingsland,
His Attorneys.

Patented Sept. 30, 1924.

1,510,264

UNITED STATES PATENT OFFICE.

GEORGE P. DORRIS, OF ST. LOUIS, MISSOURI.

STEERING-WHEEL BRAKE FOR AUTOMOBILES.

Application filed March 12, 1923. Serial No. 624,382.

*To all whom it may concern:*

Be it known that I, GEORGE P. DORRIS, a citizen of the United States, residing at St. Louis, Missouri, have invented a new and useful Improvement in Steering-Wheel Brakes for Automobiles, of which the following is a specification.

This invention relates to the front wheels of vehicles.

An object of the invention is to provide an improved oil containing pocket for the spindle of the steering knuckle, a brake mechanism mounted on the knuckle and arranged to swing around the knuckle spindle, and a brake operating bell crank lever having its driving lever end in line with the knuckle spindle when the brake is applied, and arranged so that it does not interfere in any way with the steering of the vehicle or the operation of the brake.

Another object is to provide a novel and efficient brake mechanism for the front wheels of automobiles including a drum that revolves with the front wheel and an internal shoe or band in the form of a split ring supported from the steering knuckle and having improved means for expanding the same against the inside of the drum.

Another object of the invention is to provide an improved front wheel brake in which the brake band or shoe is supported in an improved manner by the steering knuckle.

Other objects will appear from the following description, reference being made to the drawing in which—

Fig. 1 is a vertical transverse sectional view of the brake mechanism showing the steering knuckle in elevation.

Fig. 2 is an inner side elevation of the brake mechanism.

The rigid front axle 1 has a downwardly and outwardly inclined bearing at each end, the same comprising an upper portion 2 of reduced diameter and a lower portion 3 of greater diameter than the upper portion. The upper portion 2 of the bearing is preferably of uniform diameter throughout its length and the same is true of the lower portion 3. At the point of union of the upper and lower portions of the bearing an abrupt shoulder 4 is formed. The front wheel 5 revolves upon a steering spindle 6 having a steering knuckle 7 on which is mounted a bushing 8. The upper portion of the part 7 tapers downwardly to a cylindrical part 9 from which the knuckle 7 continues as a threaded part 10. At the union of the parts 9 and 10 of the steering knuckle 7 an abrupt circumferential shoulder 11 is formed. The inside of the bushing 8 is formed to fit upon the steering knuckle shaped as shown and described, and has an external shoulder abutting against the shoulder 4. A nut $10^a$ screwed on the threaded part 10 of the spindle and held from working loose by a cotter pin $10^b$ holds the bushing in proper relationship to the other parts.

The lower end of the bushing 8 is provided with an extended internally threaded portion 12. A cup 13 is screwed into the threaded portion 12, a packing ring 14 being clamped between the lower end of the bushing 8 and a circumferential shoulder on said cup. The cup 13 is removable and is designed and adapted to be filled with lubricant delivered thereto through a cup $14^a$, a passage $14^b$, and a passage $14^c$. The passage $14^c$ leads downwardly between the spindle 7—9 and the bushing 8, and opens into the cup 13. As there can be no leakage of the lubricant, the oil filled pocket described will maintain the parts in a thoroughly lubricated condition for a long duration of time.

A brake drum 15 is rigid with the front wheel 5, the inner side of the drum being open and the outer side closed. The drum encloses the steering spindle and the bearing in which it is mounted so that the mechanism forms a compact assembly.

The brake band or shoe is of the internal type and comprises an expansible and contractible split ring 16 preferably in a single piece. The ring 16 floats within the drum and is contracted by springs and expanded by a toggle device. Arms 17 are removably attached to the part 6—7 of the steering device and have laterally extended portions 18 at their outer ends in which the screw bolts 19 are adjustably supported. Clips 20 supported by the ring 16 receive the outer ends of the screw bolts 19 between their arms thereby holding the brake ring or shoe inside the brake drum, and permitting proper expansion and contraction of the ring in setting and releasing the brake. Springs 21 have their outer ends connected to the clips 20 and their inner ends to the arms 17 and exert their power to contract the ring 16. Other springs 22 have their inner ends connected to the arms 17 and their outer ends to the ring 16 below the points of connection with the springs 21 with said ring and exert their power to contract the ring. Thus, the springs wholly support the brake band or ring and prevent it from chattering against the drum, but permit it to be operated to perform its duties. The end of the cup 13 extends into a hole 13ª in the brake band and holds the band in place without interfering with its operation.

The steering part 6—7 has an upward extension 23 in the lower part of which a slot 24 is formed parallel with the axis of the spindle 6, and in the upper part of which a vertical hole is formed from the slot 24 upwardly.

A thrust member, comprising a lower part 25 extending through the hole in the upper portion of the extension 23 and a bifurcated head 26, constitutes a part of the brake setting device. The bifurcated head 26 is pivotally connected to the inner ends of links 27 the outer ends of which are pivotally connected to the brake ring or shoe 16 near the ends of said ring. Obviously, by raising the thrust member the brake ring or shoe 16 will be opened in opposition to the springs 21 and 22 to set the brake. A bell crank lever is pivotally supported by the steering device and has an arm 28 extending into the slot 24 under the lower end of the thrust member and the opposite arm 29 extending upwardly to ball and socket swivel connection 30 with an operating rod 31. The brake ring or band 16 is provided with a lining 32 of appropriate composition.

The arrangement of the parts is such that when the brake is set the connected end 30 of the arm 29 is in approximate alinement with the axis of the spindle 7—9 so that there is no interference either with the steering of the vehicle or the operation of the brake, as would be the case if the parts were in a different relationship.

From the foregoing it will be seen that my invention is a highly efficient mechanism in which there is in part a direct cooperation between the steering mechanism and the brake, since the steering knuckle supports the brake band and its operating lever always in proper relationship to the brake drum. The device embodies comparatively few parts, all of which are combined and arranged in a manner designed best to obtain greatest efficiency. The lubricant cup 13 cooperates with the other parts to retain the brake band in position and leaves the brake band free for operation without being effected by the operation of the steering mechanism at any time.

While I have shown one suitable embodiment of the invention, I am aware that the construction and arrangement may be varied without departure from its scope. I contemplate such variations as may be found of advantage and do not restrict myself to the precise arrangement shown.

What I claim and desire to secure by Letters Patent is:—

1. In an automobile having a rigid front axle, a steering knuckle swiveled in one end of said axle, a wheel rotative on the steering knuckle, a brake drum attached to said wheel, a brake band comprising an expansible and contractible split ring within the brake drum, connections on the steering knuckle for springs, springs connecting said connections and the brake band for supporting the brake band from the steering knuckle and for contracting the brake band, means supported by said connections for retaining the brake band within the drum, and means supported by the steering knuckle for expanding the brake band.

2. In an automobile, a swiveled steering knuckle, a wheel rotative on the steering knuckle, a brake drum rigid with the wheel, a brake band within the brake drum, springs supported from the steering knuckle for contracting the brake band and supporting it wholly out of contact with the brake drum, a thrust member supported by the steering knuckle, toggle links having their inner ends pivoted to said thrust member and their outer ends pivoted to said brake band, and a lever pivotally supported by the steering knuckle for actuating said thrust member to set the brake band against the brake drum in opposition to said springs.

3. In an automobile, a swiveled steering knuckle, a wheel rotative on the steering knuckle, a brake drum rigid with the wheel, a brake band within the brake drum, springs supported from the steering knuckle for contracting the brake band and supporting it wholly out of contact with the brake drum, a thrust member supported by the steering knuckle, toggle links having their inner ends pivoted to said thrust member and their outer ends pivoted to said brake band, a lever pivotally supported by the steering knuckle for actuating said thrust member to set the brake band against the brake drum in opposition to said springs, and means for utilizing an operative part of the steering knuckle to retain the brake band within the drum.

4. In an automobile, a swiveled steering knuckle, a wheel rotative on the steering knuckle, a drum attached to said wheel, a brake band within the brake drum, connections from the steering knuckle for retaining the brake band within the drum, springs connecting said connections and the brake band for contracting the brake band, a bell crank lever supported by the steering knuckle, and means operated by said lever for expanding the brake band in opposition to said springs.

5. In an automobile, a swiveled steering knuckle, a lubricant containing cup for supplying lubricant to the steering knuckle, a wheel rotative on the steering knuckle, a drum rigid with said wheel, a brake band within said drum engaged by said cup and thereby retained within said drum, other elements cooperating with said cup to retain the band within the drum, springs for contracting the band, a thrust member slidably supported by the steering knuckle, links connecting said thrust member with said band, and a bell crank lever pivotally supported by the said steering knuckle for operating said thrust member to expand the band.

6. In an automobile, a swiveled steering knuckle, a wheel rotative on the steering knuckle, a brake drum rigid with said wheel, a brake band within the drum, an extension projecting upwardly from the steering knuckle, a thrust member slidable in said extension at right angles to the axis of that part of the steering knuckle on which the wheel is mounted, a pair of links connecting said thrust member with said band, and a bell crank lever pivoted to said extension for operating said thrust member.

7. In an automobile, a swiveled steering knuckle, a wheel rotative on the steering knuckle, a brake drum rigid with said wheel, a brake band within the drum, an extension projecting upwardly from the steering knuckle, a thrust member slidable in said extension at right angles to the axis of that part of the steering knuckle on which the wheel is mounted, a pair of links connecting said thrust member with said band, a bell crank lever pivoted to said extension for operating said thrust member, elements supported by the steering knuckle for retaining the brake band within said drum, and springs supported from the steering knuckle for contracting the brake band.

8. In an automobile, a swiveled steering knuckle, a lubricant cup at the lower end of the steering knuckle, a wheel rotative on the steering knuckle, a brake drum attached to said wheel, a brake band within the brake drum engaging said lubricant containing cup and being thereby retained within the brake drum, springs supported from the steering knuckle for contracting said band, and mechanism supported by the steering knuckle for expanding said band.

9. In an automobile, a swiveled steering knuckle, a cup at the lower end of the knuckle for containing lubricant, and a passage through the steering knuckle for conducting lubricant into said cup.

10. In an automobile, a front axle, a bearing at the end of the axle, a steering knuckle having a spindle extending through said bearing, a bushing on said spindle, a cup in connection with said bushing enclosing the lower end of the spindle, and a passage through the spindle for conducting a lubricant into said cup.

11. In an automobile, an axle, a bearing, a steering knuckle swiveled in said bearing, a cup enclosing the lower end of the swiveled knuckle, a passage through the steering knuckle for conducting a lubricant into said cup, a brake band encircling said spindle and engaging said cup, and a lever for setting said brake band in braking position and having its operating end in axial alinement with the axis of the swiveled portion of said spindle when the brake is applied.

12. In an automobile having an axle, a steering knuckle, a spindle in connection with the knuckle swiveled in said axle, a brake band supported around the steering knuckle, a lever pivotally supported by said spindle for applying the brake band, a connection to one end of said lever for operating the same to apply the brake band, and a brake drum surrounding and being engaged by said brake band when the connected end of said lever is in axial alinement with said spindle.

13. In an automobile having an axle, a steering knuckle, a spindle in connection with the knuckle swiveled in said axle, a brake band supported around the steering knuckle, a lever for applying the brake band, a connection to one end of said lever for operating the same to apply the brake band, a brake drum engaged by said brake band when the connected end of said lever is in axial alinement with said spindle, and a cup for containing lubricant in said spindle engaging said band.

14. In an automobile having an axle, a steering knuckle, a spindle in connection with the knuckle swiveled in said axle, a brake band supported around the steering knuckle, a lever for applying the brake band, a connection to one end of said lever for operating the same to apply the brake band, a brake drum engaged by said brake band when the connected end of said lever is in axial alinement with said spindle, a cup for containing lubricant in said spindle engaging said band, and a passage through said spindle for conducting lubricant into said cup.

15. The combination with the front wheel of an automobile, and a swiveled knuckle on which said wheel is mounted, of a brake drum attached to the front wheel, a brake band surrounding the knuckle within the brake drum, a bell crank lever pivotally supported by the knuckle, an actuator in connection with one end of said lever, and means whereby said lever will set the brake band against the brake drum when said lever is moved to position in which the end of said lever with which said actuator is connected is in axial alinement with the swivel of the knuckle.

16. The combination with the front wheel of an automobile, and a swiveled knuckle on which said wheel is mounted, of a brake drum attached to the front wheel, a brake band surrounding the knuckle within the brake drum, a bell crank lever pivotally supported by the knuckle, means whereby said lever will set the brake band against the brake drum when said lever is moved to position in which one end is in axial alinement with the swivel of the knuckle, and a lubricant containing cup for the spindle engaging said brake band.

17. The combination with the front wheel of an automobile, and a swiveled knuckle on which said wheel is mounted, of a brake drum attached to the front wheel, a brake band surrounding the knuckle within the brake drum, a bell crank lever pivotally supported by the knuckle, means whereby said lever will set the brake band against the brake drum when said lever is moved to position in which one end is in axial alinement with the swivel of the knuckle, a lubricant containing cup for the knuckle engaging said brake band, and a passage through the knuckle for conducting a lubricant into said cup.

GEORGE P. DORRIS.